(12) United States Patent
de Judicibus

(10) Patent No.: US 8,113,959 B2
(45) Date of Patent: Feb. 14, 2012

(54) METHOD AND SYSTEM FOR RENDERING THE SCENES OF A ROLE PLAYING GAME IN A METAVERSE

(75) Inventor: Dario de Judicibus, Rome RM (IT)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 12/328,372

(22) Filed: Dec. 4, 2008

(65) Prior Publication Data

US 2010/0144441 A1   Jun. 10, 2010

(51) Int. Cl.
*H04N 5/783* (2006.01)
(52) U.S. Cl. .......................................... 463/42; 715/731
(58) Field of Classification Search .................... 463/40, 463/42; 705/704, 731
See application file for complete search history.

(56) References Cited

U.S. PATENT DOCUMENTS

2002/0112180 A1* 8/2002 Land et al. .................... 713/200
2005/0202877 A1   9/2005 Uhlir et al.

FOREIGN PATENT DOCUMENTS

EP           1082984 A2    3/2001

* cited by examiner

*Primary Examiner* — Thomas L Dickey
(74) *Attorney, Agent, or Firm* — Ronald A. Kaschak; Kevin P. Radigan, Esq.; Heslin Rothenbery Farley & Mesiti P.C.

(57) ABSTRACT

In order to facilitate rendering of scenery elements in a role playing game, or in any other virtual universe (also known as a metaverse), there is provided a scenery container together with a play manager which cooperatively interact to achieve the loading, saving and storage of sets of scenery elements. Renderings are thus carried out more quickly and efficiently and with easier efforts on the part of the users.

20 Claims, 6 Drawing Sheets

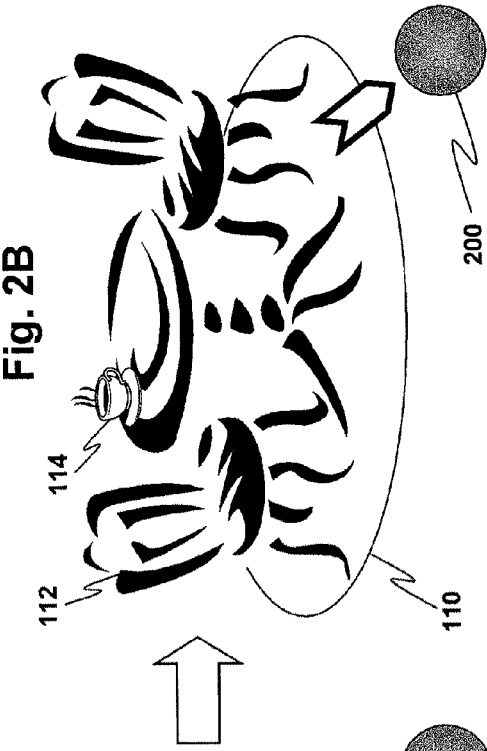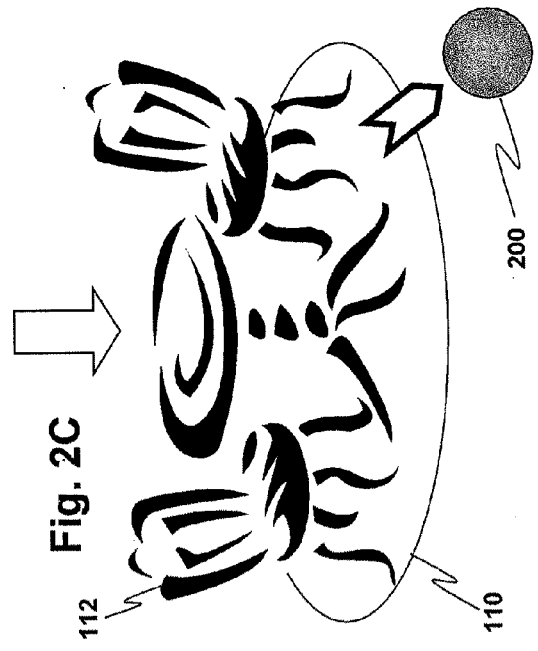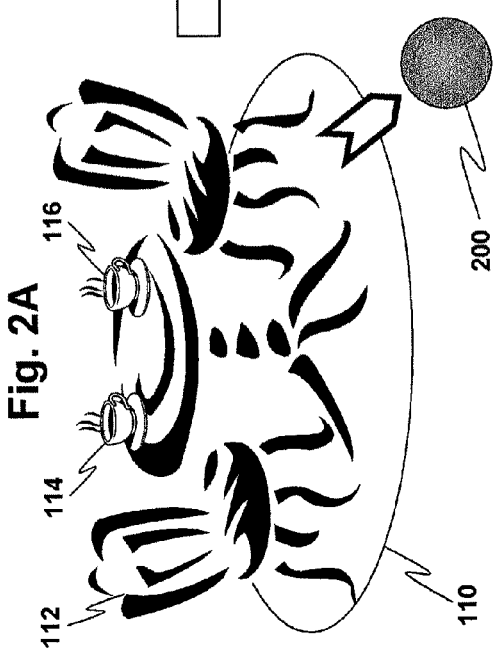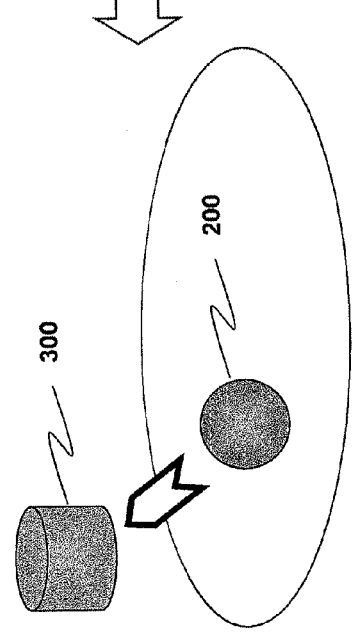

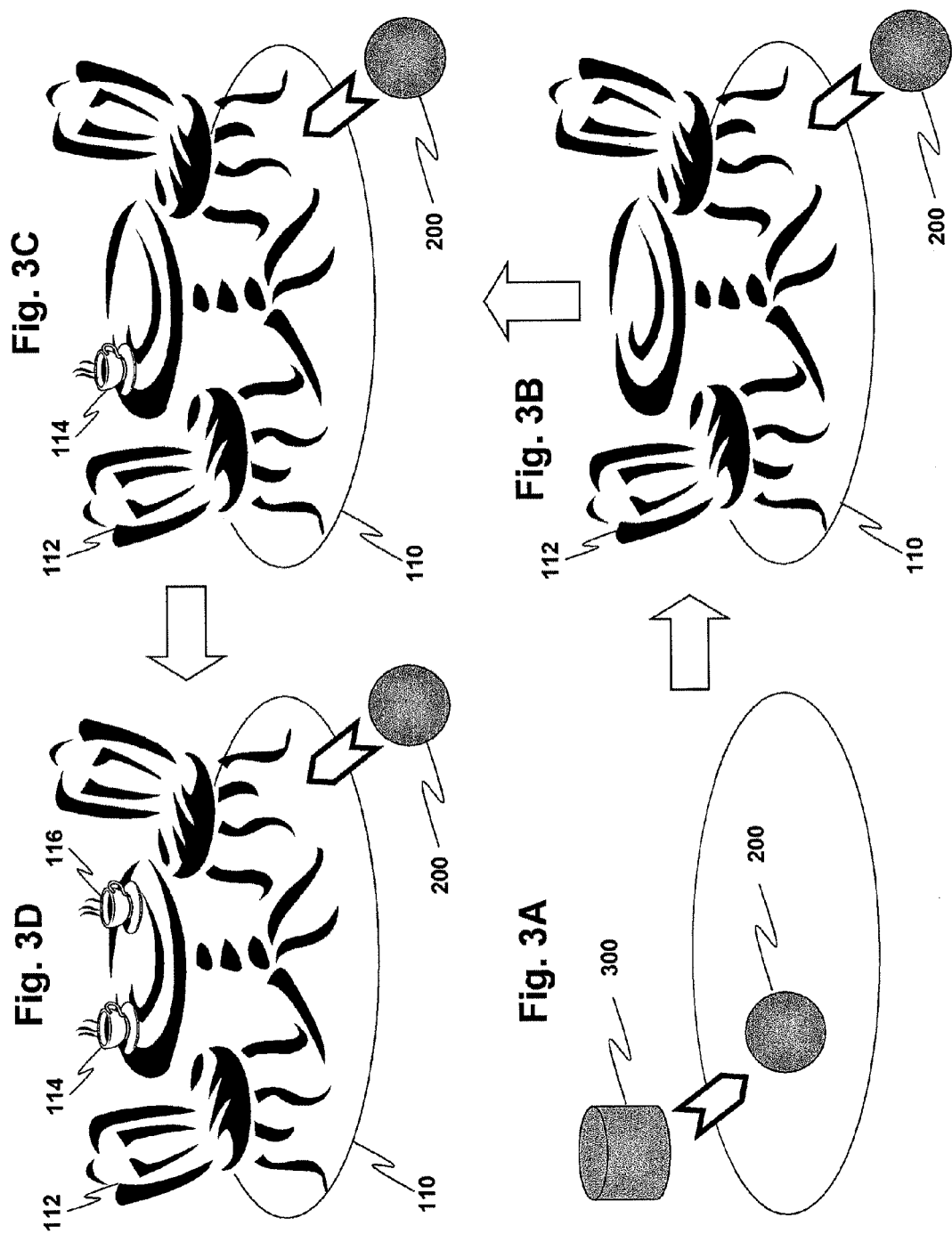

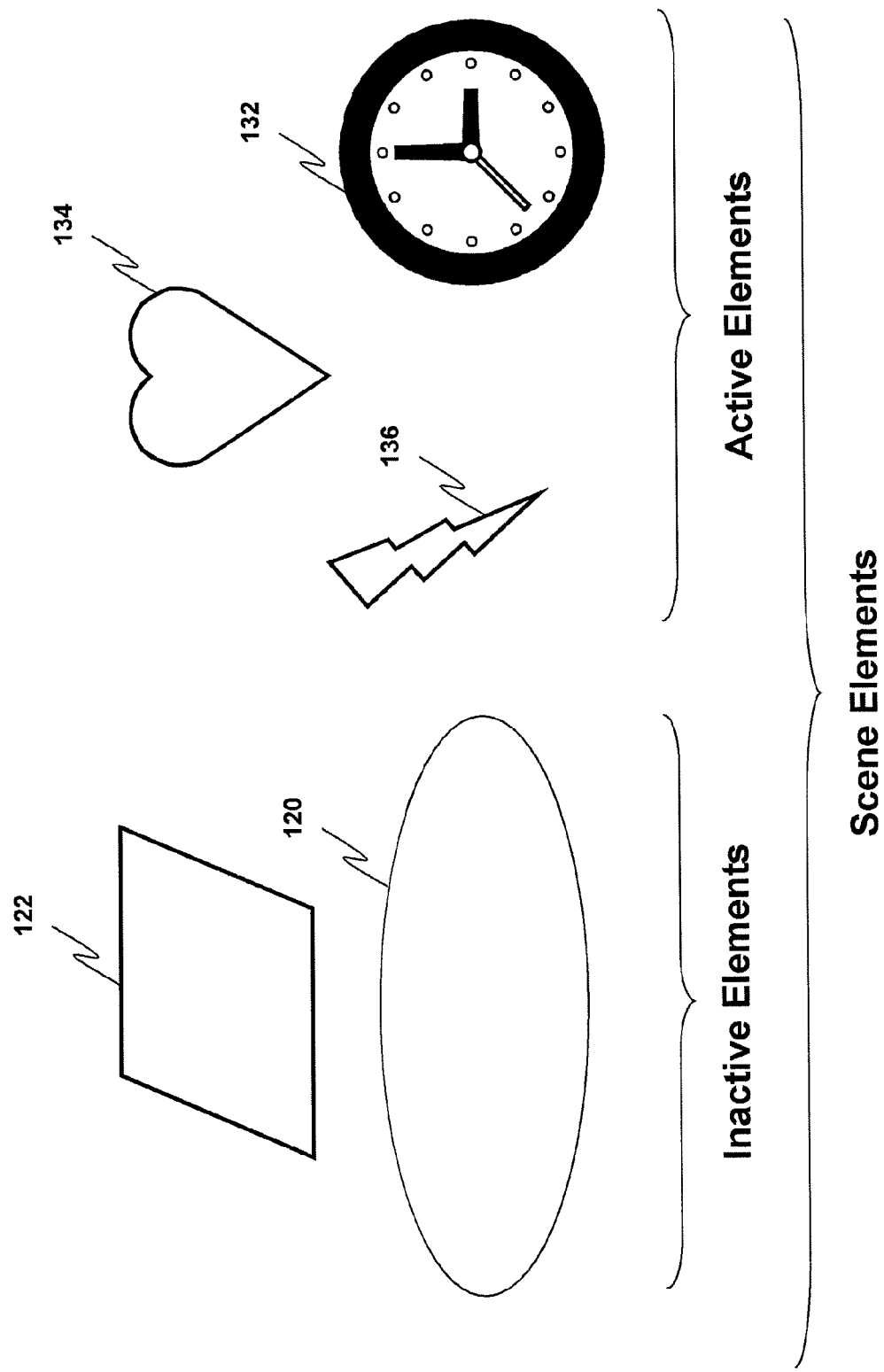

METHOD AND SYSTEM FOR RENDERING THE SCENES OF A ROLE PLAYING GAME IN A METAVERSE

TECHNICAL FIELD

This invention relates, in general, to virtual world program applications and, more particularly, to methods and systems for controlling the rendering of scenery in role playing games.

BACKGROUND OF THE INVENTION

Role Playing Games (RPGs) provide a powerful mechanism for performing many activities in fully immersive virtual environments known as metaverses. One of the most famous examples of such a metaverse is the program referred to as Second Life®. While these programs are often referred to as "games," they are nonetheless highly practical devices used in education, psychotherapy and in benchmarking to name just a few applications. Those involved with virtual universes, and particularly developers of them, make a distinction between "games" and what they refer to as "serious games."However, in general, Role Playing Games typically comprise two principal elements: scenography and a script. The scenography is related to the stage, the scenes and the costumes. The script is related to roles, actions, dialogs and events.

A play is usually divided into acts and scenes. Different scenery is associated with each scene. Each scene may be quite complicated and may contain both active and inactive elements. Active elements may interact with avatars, whereas inactive elements are used by avatars but have no inherent automatic programmed behavior. An avatar is a graphical representation that a user selects that other users can see, often taking the form of a cartoon-like human but with increasing desire to render the depiction in more realistic fashion. Active elements are usually found in specific states in a time sequence. Once a role playing game is started, it is often desirable to rapidly change the scenery as the play proceeds. Since a scene is made of many objects in specific positions and states, it often takes a lot of time and manual effort to remove the previous scenery and something to do with new scenery elements.

The present invention is seen to have many uses and applications. In particular, it may be used in an education environment for simulations related to on-the-job training. In cinematic applications, it is useful for providing a substitute for storyboard production. In an architectural environment, it is useful for simulating the flow of people in malls and in other locations, both public and private. In a business environment, it is applicable for use in serious game playing, role playing, and in the analysis of user interaction scenarios.

Note that, throughout this disclosure, for clarity of presentation only, reference is made to an individual or avatar, which is a digital representative of the individual. However, it should be noted that this term not only applies to an individual, but to any computerized processes that may execute on behalf of the individual, using the same credentials and capabilities of the individual that owns/controls the process. In general, this embodies many forms, such as prescheduled, automatically running maintenance processes, system level processes (owned by the system administrator), etc. In all cases, this process is treated like an avatar, with the same inputs and outputs, regardless of whether the credentials come directly from an individual or from a computerized process acting in his or her stead.

From the above, it is therefore seen that there exists a need in the art to overcome the deficiencies and limitations described herein and above.

SUMMARY OF THE INVENTION

The shortcomings of the prior art are overcome and additional advantages are provided by taking advantage of two auxiliary objects: a Play Manager (PM) and a Scenery Container (SC). The play manager takes care of generating and removing scenery. The scenery container manages the storing and rendering of each element of a scene in the right position and state. These two objects work together in a coordinated fashion to minimize user effort and to maximize the speed at which objects are rendered. Duplication of effort on the part of a user is avoided.

In accordance with one embodiment of the present invention, a computer-implemented method for rendering scenery in a virtual universe environment comprises: creating a set of scenery elements for a stage; providing a scenery container for these scenery elements; storing these scenery elements in the scenery container; and loading the scenery container into the inventory of a play manager. It should be particularly noted that it is not necessary that a scene represents real objects, that is, real life. One can use a metaverse to represent symbolic objects as well.

The shortcomings of the prior art are overcome and additional advantages are provided through the provision of a computer program product for rendering scenery in a virtual universe environment. The computer program product comprises a storage medium readable by a processing circuit and storing instructions for execution by a computer for performing a method. The method includes, for instance, steps for both loading and saving sets of scenery elements.

Additional features and advantages are realized through the techniques of the present invention. Other embodiments and aspects of the invention are described in detail herein and are considered a part of the claimed invention. Methods and systems relating to one or more aspects of the present invention are also described and claimed herein. Furthermore, services relating to one or more aspects of the present invention are also described and may be claimed herein.

Accordingly, it is an object of the present invention to render scenes more quickly and to thus provide the user with a more realistic experience.

It is also an object of the present invention to trace the evolution of a set of dynamic objects in a metaverse and store them as snapshots to be reproduced as separated scenes.

It is yet another object of the present invention to create a 3D storyboard from action.

It is a still further object of the present invention to simulate the evolution of a system in a simulation environment.

It is also an object of the present invention to provide a system and method for rendering a scenery which is independent of a specific metaverse.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both

FIGS. 2A-2D is a series of illustrations illustrating the process in which a set of scene elements is saved and stored in a Scene Container;

FIG. 3A-3D is a series of illustrations similar to FIGS. 2A-2D except that it illustrates the reverse process namely that of loading the contents of a scene container onto a given stage;

FIG. 4 illustrates the splitting of scene elements into inactive elements and active elements and further provides exemplary illustrations thereof.

DETAILED DESCRIPTION

Figure 1:
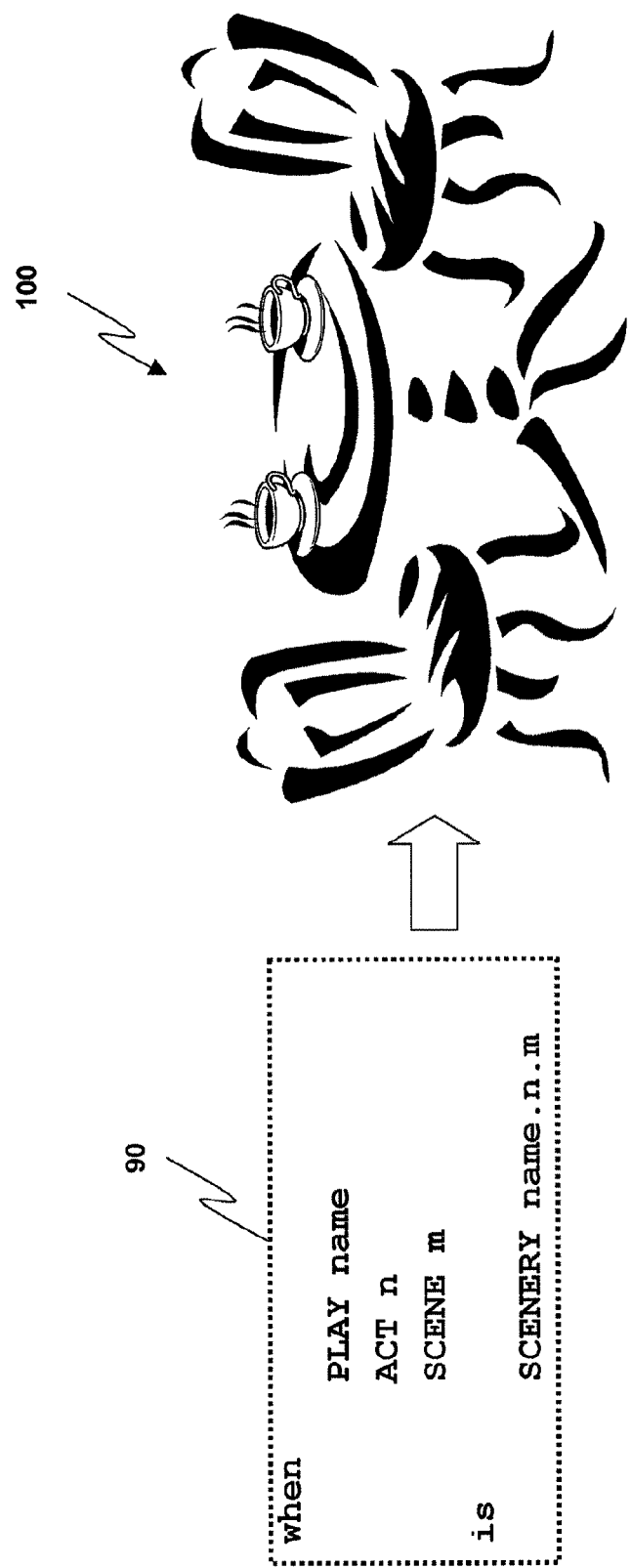
FIG. 1 illustrates the structure of commands provided to the Play Manager in relation to the processing of an illustrative scene set.

Before proceeding, some preliminary comments are in order. For the purposes of the present description of scenery can be considered to be everything except the avatars. The stage upon which play takes place can be considered to be either a fixed element existing outside of the scenery or it may in fact be included as part of the scenery, depending upon the specific were playing game be used. In the case that the stage exists outside of the scenery, the stage itself may play the role of the Play Manager.

The present invention identifies a mechanism and a set of standards which are used to design and implement role playing games. The present invention develops and infrastructure based upon a set of objects and scripts which are used in role playing games. The present invention also defines a process to instruct participants, manages the game and capitalizes on evidence generated during the game. A more advanced implementation of the present invention also "learns" during the performance. For example, a theatre scene is determined to always be rendered in the same way at the beginning of act even if during act some object is moved by actors. However, in a brainstorming session where objects represent a model to be refined, a mechanism is provided to store the position of objects at the end of the act in order to render them in the same position next time that act is performed. This is useful in breaking an action and starting again from where it was left off.

The present invention is independent of the specific metaverse being imported. In particular, the present invention is not tightly coupled to the architecture employed in Second Life®. However, it is only necessary that the metaverse provides some way to script actions, that is, a programming language to control metaverse objects. This is true for almost all currently developed metaverses. The present invention is open and is not based upon proprietary standards. The present invention is flexible in that it is able to realize any scenario and is not limited by its size. The present invention is also advantageous in that skill and effort needed for setup are minimal. The process of the present invention is simple, easy to learn and easy to teach. The present invention is also manageable in that it is easy to apply it to any given scenario. In addition, specific tools are developed to setup the Play Manager and the Scenery Container without knowledge of a programming language, that is, by using visual techniques "in world." The term "in world" is used by those skilled in the metaverse arts to distinguish tools that are used while the avatar is inside the metaverse as opposed to tools that are used outside of a metaverse environment and which require that the resulting product be loaded into the metaverse at a later time by an importing mechanism.

The method of the present invention is based upon two auxiliary objects: the Scene Container and the Play Manager. The method of the present invention is also based upon an event driven object to object protocol which is simple and language independent. In particular, the language structure of the present invention is simple in that it simply comprises a command coupled with a parameter list. It is also to be specifically noted that since many metaverse implementations do not provide an efficient parser for XML, XML is not being employed in a first version of the architecture of the present invention.

In the present invention, a role playing game is structured as a theatrical play, that is, it is divided into acts and scenes. Every act and scene is numbered and is associated with a specific scenery set. Each scenery set is made up of a number of objects of any kind and shape. The objects in each scenery set may be either active or inactive and they exist within a well-defined space. This well-defined space is typically referred to as the "stage."

For the purposes of the present invention, a Scenery Container is an object in the Object Oriented Programming (OOP) sense and includes operational code and a database, file or similar data structure which includes a set of scenery elements described in sufficient detail for purposes of visually rendering them on a screen together with information as to their position, either absolute or relative, and indications as to how these elements change or are modified in response to the passage of time and/or other events. Both Play Manager and Scenery Container are objects in OOP terminology, that is, they comprise data which is encapsulated by methods. In operation Play Manager controls the flow of action in a role playing game or virtual universe and which interacts with the Scenery Container to provide visual information to be portrayed on a screen.

FIG. 1 provides an illustration of an exemplary scene 100 together with a segment of program code 90 which is used to produce the elements in the scene by means of a visual rendition which is linked to the name of a particular play, a particular act within the play, and a particular scene within the act. The terms "PLAY," "ACT," "SCENE," and "SCENERY" are keywords used to interpret a value, which is usually positioned after the keyword.

FIGS. 2A-2D illustrate a process in which elements of a scene on stage 110 are saved within Scenery Container 200 which is linked by play name, act and scene number to be part of a role playing game. In particular, it is noted that the saving progression proceeds from FIG. 2A to FIG. 2D. In the first portion of the process illustrated, cup 116 is saved in Scene Container 200. See FIG. 2B. In a second portion of the process, second cup 114 is saved in the same Scene Container. See FIG. 2C. In a third portion of the process, the table and chairs 112 are likewise stored in Scene Container 200. Lastly, scenery container 200 is stored with Play Manager 300. See FIG. 2D. This latter storage operation does not, however, have to be direct but rather may be accomplished via an external link. It is also noted that, solely for purposes of ease of illustration, the table and chairs are described herein in a monolithic fashion. However, in practice, it is noted that not only would the table and chairs comprise individual scenery elements in their own right, but it is also the case that the table and chairs are typically described within the scenery container as themselves comprising individual subelements. The same is true of cups 114 and 116.

FIGS. 3A-3D illustrate a process which is the reverse of that shown in FIGS. 2A-2D. In this process, as a first step, Play Manager 300 loads Scenery Container 200. Such an action may, for example, be invoked by program code 90 shown in FIG. 1. See FIG. 3A. In a second step, Scenery Container 200 renders (that is, visually creates) table and chairs 112. See FIG. 3B. In a third step, Scenery Container 200 renders cup 114. See FIG. 3C. In a fourth step, Scenery Container 200 renders cup 116. See FIG. 3D.

FIG. 4 illustrates the fact that a scene may comprise both active and inactive elements. For example, an inactive element may comprise a scene wall, as illustrated by element 122 or may in fact also include stage 120. Active elements may include such items as clock 132, beating heart in 134 or lightning bolt 136.

Figure 5:
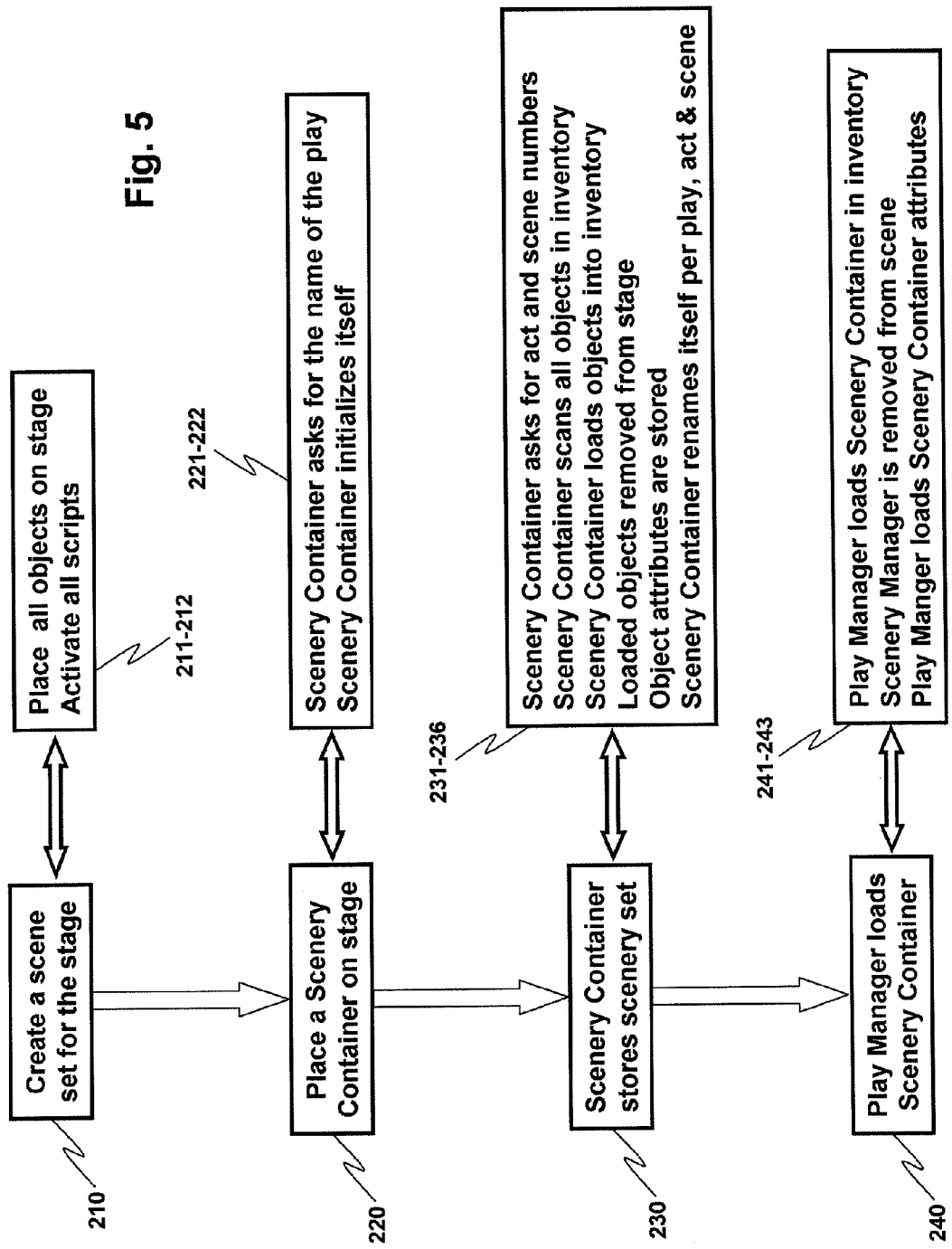
FIG. 5 is a flowchart illustrating the steps in the process of loading a set of scenery elements onto a stage.

FIG. 5 illustrates a detailed process for loading a Scenery Container. In this respect, it is useful to keep in mind that this is a process step which is used for structuring the contents of a Scene Container. Moreover, it should be specifically noted that it is this process which facilitates the ease of scene construction by a user and or virtual universe developer. Each of the steps 210 through 240 are also illustrated in greater detail in FIG. 5. In first step 210, a scene that is set for a stage is created. In second step 220 a Scenery Container is placed on the stage. In third step 230 the scenery set is stored in the Scenery Container. In a last step, the Scenery Container is loaded (or otherwise linked to or associated with) the Play Manager.

In preferred embodiments of the present invention, step 210 includes placing all of the objects on the stage (step 211) and activating all necessary scripts (step 212).

In step 220, the scenery container asks for the name of the play (step 221) and the scenery container initializes itself (step 222). Initialization includes defining a coordinate system to be used to store relative position and orientation for all of the objects in the scene, and if necessary, to allocate memory.

In step 230, the Scenery Container asks for the specific act and scene numbers (step 231). The scenery container then scans all of the objects in its inventory (step 232). All of the objects that are on the stage are then loaded into the Scenery Container (step 233) as part of its inventory of set elements for this particular play act and scene. The objects that were loaded onto stage are now preferably removed (step 234). The attributes of the set elements are also now stored in the scenery container (step 235). Lastly, the Scenery Container renames itself in accordance with the name of the play, the specific act, and scene number (step 236).

In step 240, the Play Manager loads the scenery container in its own inventory (step 241). The scenery container is then removed from the scene (step 242). Lastly, the Play Manager acquires the attributes of the scenery container (step 243).

Figure 6:
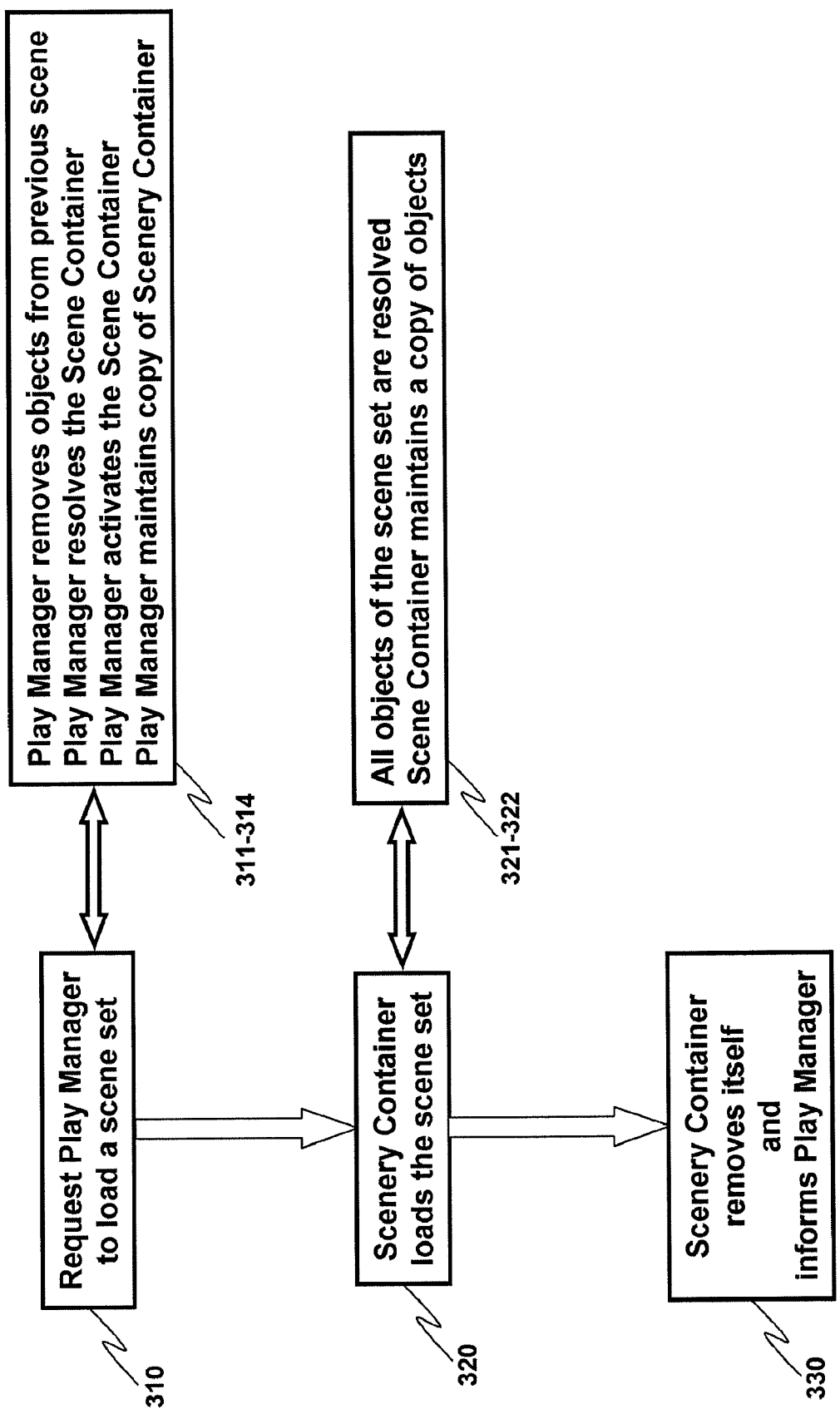
FIG. 6. Is a flowchart similar to FIG. 5 except that it illustrates the process of saving a set of scenery elements in a Scene Container.

In effect, FIG. 6 represents a reversal of the process shown in FIG. 5. Broadly this process begins with a request to the Play Manager to load a scene set (step 310). Next, the Scenery Container loads the scene set (step 320). Lastly, the Scenery Container removes itself and informs the Play Manager (step 330).

Looking at the process illustrated in FIG. 6 in greater detail, one finds that step 310 typically involves the following set of steps. In step 311, the Play Manager removes objects from the previous scene. In step 312, the Play Manager resolves any references to the Scene Container. In step 313, the Play Manager activates the Scene Container. In step 314, a copy of the Scenery Container is maintained by the Play Manager. Following this, step 330 is carried out.

Moreover, one or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer usable medium, in which the computer medium comprises one or more aspects of the present invention. The code in combination with the computer system is capable of performing one or more aspects of the present invention.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A computer-implemented method for saving a set of scenery elements on a stage in a virtual universe environment, said method comprising:

creating a set of scenery elements for said stage, said scenery elements comprising one or more active objects of a role playing game, wherein the one or more active objects interact with avatars in said role playing game during gameplay thereof, and wherein said one or more active objects change object states across a time sequence of said role playing game;

providing a scenery container for said scenery elements, said scenery container being linked to be part of said role playing game by a scene identifier of said role playing game, said scenery container facilitating managing storage and rendering of said one or more active objects in correct positions and object states on said stage;

responsive to breaking gameplay action of said role playing game, storing said scenery elements in said scenery container, said storing comprising storing indications as to said correct positions of said one or more active objects and indications as to how said one or more active objects change state in response to passage of time of said time sequence of said role playing game, wherein said storing facilitates, responsive to resuming gameplay action of said role playing game, rendering each active object of said one or more active objects in a respective same position and same state of said active object as when gameplay action was broken; and loading said scenery container into inventory of a play manager, said play manager controlling a flow of action in said role playing game.

2. The method of claim 1 in which said creating includes placing said scenery elements on said stage and activating scripts within said play manager.

3. The method of claim 1 in which said providing includes the scenery container requesting a play name from said play manager and initializing itself, said initializing comprising defining a coordinate system to be used to store relative position and orientation for said one or more active objects.

4. The method of claim 1 in which said storing includes:
requesting and receiving act and scene numbers for said play name, said act and scene numbers corresponding to a current act and scene of said role playing game at which gameplay action is broken;
scanning said scenery elements on said stage and placing them in an inventory for said scenery container, said inventory corresponding to an inventory of elements for said current act and scene of said role playing game;
removing said scanned scenery elements from said stage and storing in said scenery container scenery element attributes of said scanned scenery elements; and
renaming said scenery container so as to correspond to said act and scene numbers for said play name.

5. The method of claim 1 in which said loading includes:
loading, by said play manager, said scenery container into an inventory for said play manager;
removing said scenery container from said stage; and
saving attributes of said scenery container by said play manager.

6. The method of claim 1, wherein:
said creating includes placing said scenery elements on said stage and activating scripts within said play manager;
said providing includes the scenery container requesting a play name from said play manager and initializing itself, said initializing comprising defining a coordinate system to be used to store relative position and orientation for said one or more active objects;
said storing includes:
requesting and receiving act and scene numbers for said play name, said act and scene numbers corresponding to a current act and scene of said role playing game at which gameplay action is broken;
scanning said scenery elements on said stage and placing them in an inventory for said scenery container, said inventory corresponding to an inventory of elements for said current act and scene of said role playing game;
removing said scanned scenery elements from said stage and storing in said scenery container scenery element attributes of said scanned scenery elements; and
renaming said scenery container so as to correspond to said act and scene numbers for said play name; and
said loading includes:
loading, by said play manager, said scenery container into an inventory for said play manager;
removing said scenery container from said stage; and
saving attributes of said scenery container by said play manager.

7. A computer-implemented method for rendering a set of scenery elements on a stage in a virtual universe environment, said method comprising:
responsive to resuming gameplay action of a role playing game of said virtual universe environment, wherein said scenery elements comprise one or more active objects of a role playing game, wherein the one or more active objects interact with avatars in said role playing game during gameplay thereof and wherein said one or more active objects change object states across a time sequence of said role playing game:
requesting a play manager to load said set of scenery elements onto said stage;
loading said set of said scenery elements on said stage by a scenery container, said scenery container being linked to be part of said role playing game by a scene identifier of said role playing game, said scenery container facilitating managing storage and rendering of said one or more active objects in correct positions and object states on said stage, wherein storing said one or more active objects comprises, responsive to breaking gameplay action of said role playing game, storing indications as to said correct position of said one or more active objects and indications as to how said one or more active objects change state in response to passage of time of said time sequence of said role playing game, and said storing facilitating rendering each active object of said one or more active objects in a respective same position and same state of said active object as when gameplay action of said role playing was broken; and
causing said scenery container to remove itself and inform said play manager.

8. The method of claim 7 in which said requesting includes:
removing objects from a previous scene of said role playing game by said play manager;
resolving one or more references to said scenery container by said play manager;
activating said scenery container by said play manager; and
maintaining a copy of said scenery container by said play manager.

9. The method of claim 7 in which said loading includes:
resolving scenery elements present in said scenery container on said stage; and
maintaining a copy of said scenery elements by said scene container.

10. The method of claim 7, wherein:
said requesting includes:
removing objects from a previous scene of said role playing game by said play manager;
resolving one or more references to said scenery container by said play manager;
activating said scenery container by said play manager; and
maintaining a copy of said scenery container by said play manager; and said loading includes:
resolving scenery elements present in said scenery container on said stage; and
maintaining a copy of said scenery elements by said scene container.

11. A computer program product to facilitate saving a set of scenery elements on a stage in a virtual universe environment, the computer program product comprising:
a storage medium readable by a processing circuit and storing instructions for execution by the processing circuit for performing a method comprising:
creating a set of scenery elements for said stage, said scenery elements comprising one or more active objects of a role playing game, wherein the one or more active objects interact with avatars in said role playing game during gameplay thereof, and wherein said one or more active objects change object states across a time sequence of said role playing game;

providing a scenery container for said scenery elements, said scenery container being linked to be part of said role playing game by a scene identifier of said role playing game, said scenery container facilitating managing storage and rendering of said one or more active objects in correct positions and object states on said stage;

responsive to breaking gameplay action of said role playing game, storing said scenery elements in said scenery container, said storing comprising storing indications as to said correct positions of said one or more active objects and indications as to how said one or more active objects change state in response to passage of time of said time sequence of said role playing game, wherein said storing facilitates, responsive to resuming gameplay action of said role playing game, rendering each active object of said one or more active objects in a respective same position and same state of said active object as when gameplay action was broken; and loading said scenery container into inventory of a play manager, said play manager controlling a flow of action in said role playing game.

12. The computer program product of claim 11 in which said creating includes placing said scenery elements on said stage and activating scripts within said play manager.

13. The computer program product of claim 11 in which said providing includes the scenery container requesting a play name from said play manager and initializing itself, said initializing comprising defining a coordinate system to be used to store relative position and orientation for said one or more active objects.

14. The computer program product of claim 11 in which said storing includes:
requesting and receiving act and scene numbers for said play name, said act and scene numbers corresponding to a current act and scene of said role playing game at which gameplay action is broken;
scanning said scenery elements on said stage and placing them in an inventory for said scenery container, said inventory corresponding to an inventory of elements for said current act and scene of said role playing game;
removing said scanned scenery elements from said stage and storing in said scenery container scenery element attributes of said scanned scenery elements; and
renaming said scenery container so as to correspond to said act and scene numbers for said play name.

15. The computer program product of claim 11 in which said loading includes:
loading, by said play manager, said scenery container into an inventory for said play manager;
removing said scenery container from said stage; and
saving attributes of said scenery container by said play manager.

16. A computer system for saving a set of scenery elements on a stage in a virtual universe environment said computer system comprising:
a memory; and
a processor in communications with the memory, wherein the computer system is configured to perform:
creating a set of scenery elements for said stage, said scenery elements comprising one or more active objects of a role playing game, wherein the one or more active objects interact with avatars in said role playing game during gameplay thereof, and wherein said one or more active objects change object states across a time sequence of said role playing game;

providing a scenery container for said scenery elements, said scenery container being linked to be part of said role playing game by a scene identifier of said role playing game, said scenery container facilitating managing storage and rendering of said one or more active objects in correct positions and object states on said stage;

responsive to breaking gameplay action of said role playing game, storing said scenery elements in said scenery container, said storing comprising storing indications as to said correct positions of said one or more active objects and indications as to how said one or more active objects change state in response to passage of time of said time sequence of said role playing game, wherein said storing facilitates, responsive to resuming gameplay action of said role playing game, rendering each active object of said one or more active objects in a respective same position and same state of said active object as when gameplay action was broken; and loading said scenery container into inventory of a play manager, said play manager controlling a flow of action in said role playing game.

17. The computer system of claim 16 in which said creating includes placing said scenery elements on said stage and activating scripts within said play manager.

18. The computer system of claim 16 in which said providing includes the scenery container requesting a play name from said play manager and initializing itself, said initializing comprising defining a coordinate system to be used to store relative position and orientation for said one or more active objects.

19. The computer system of claim 16 in which said storing includes:
requesting and receiving act and scene numbers for said play name, said act and scene numbers corresponding to a current act and scene of said role playing game at which gameplay action is broken;
scanning said scenery elements on said stage and placing them in an inventory for said scenery container, said inventory corresponding to an inventory of elements for said current act and scene of said role playing game;
removing said scanned scenery elements from said stage and storing in said scenery container scenery element attributes of said scanned scenery elements; and
renaming said scenery container so as to correspond to said act and scene numbers for said play name.

20. The computer system of claim 16 in which said loading includes:
loading, by said play manager, said scenery container into an inventory for said play manager;
removing said scenery container from said stage; and
saving attributes of said scenery container by said play manager.

* * * * *